May 26, 1970 — R. C. GOODWIN — 3,514,033
PLASTIC BAG WITH HANDLE
Filed Oct. 25, 1968 — 5 Sheets-Sheet 1
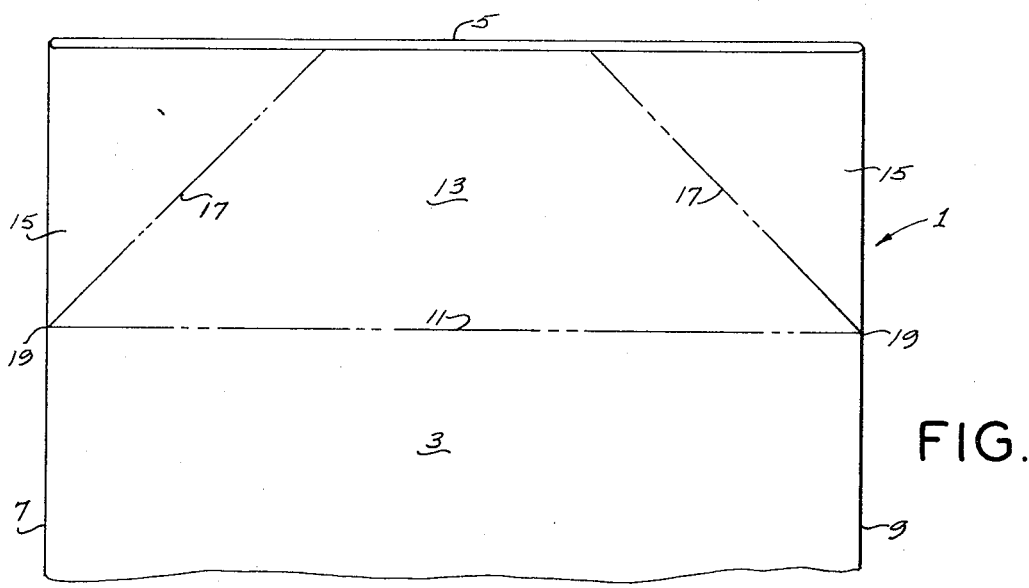
FIG. 1
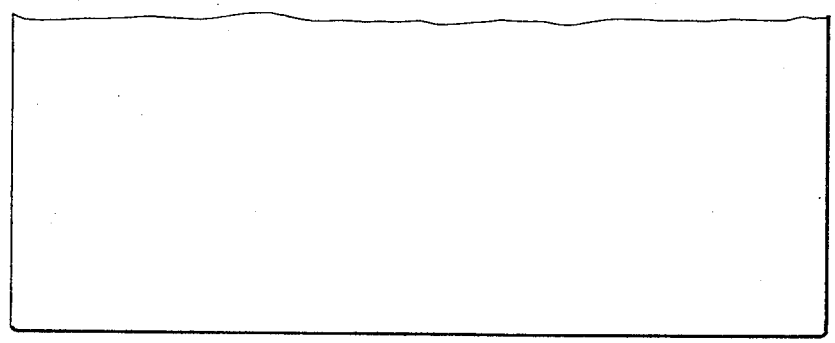
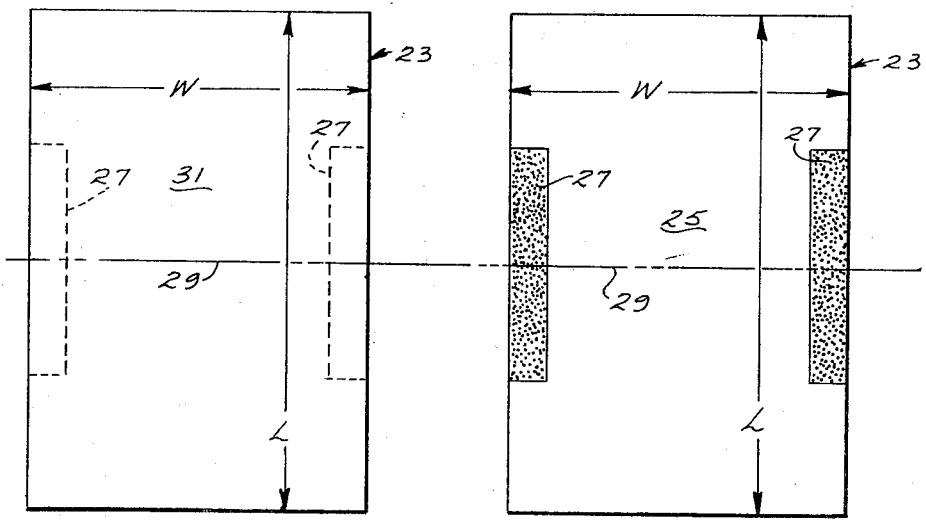
FIG. 2     FIG. 3
Ralph C. Goodwin, Inventor
Koenig, Senniger, Powers and Leavitt, Attorneys May 26, 1970  R. C. GOODWIN  3,514,033

PLASTIC BAG WITH HANDLE

Filed Oct. 25, 1968  5 Sheets-Sheet 4

May 26, 1970  R. C. GOODWIN  3,514,033
PLASTIC BAG WITH HANDLE
Filed Oct. 25, 1968  5 Sheets-Sheet 5
FIG. 15
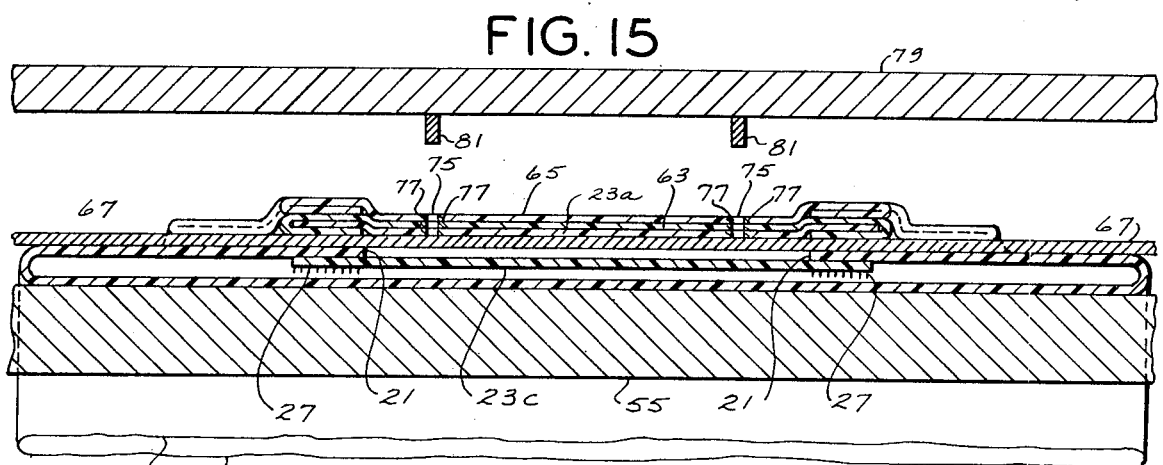
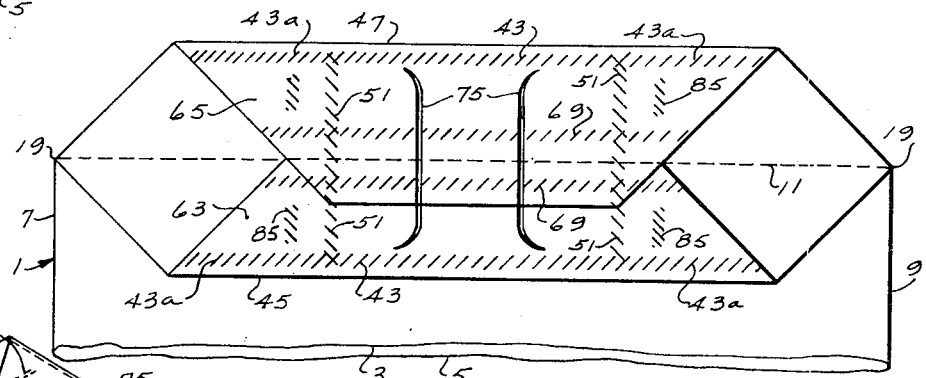
FIG. 16
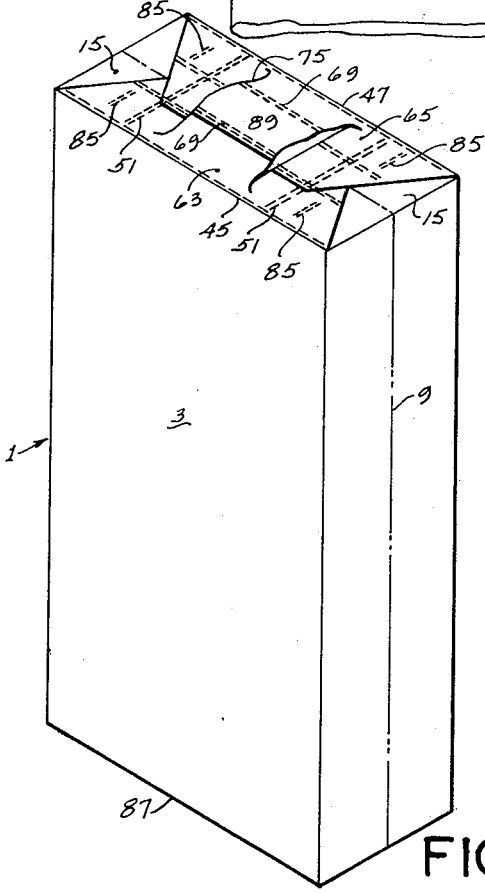
FIG. 17
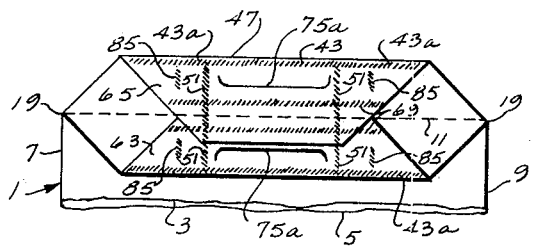
FIG. 18

United States Patent Office 3,514,033
Patented May 26, 1970

3,514,033
PLASTIC BAG WITH HANDLE
Ralph C. Goodwin, Wayzata, Minn., assignor to Bemis Company, Inc., Minneapolis, Minn., a corporation of Missouri
Filed Oct. 25, 1968, Ser. No. 770,708
Int. Cl. B65d 33/06
U.S. Cl. 229—54         11 Claims

ABSTRACT OF THE DISCLOSURE

A plastic bag having a bottom closure (which may be a valved diamond-fold or satchel bottom closure) and a diamond-fold or satchel top closure in which the side flaps of the top closure are provided with a pair of slits extending alongside one another, the portion of the side flaps between these slits being free of the underlying portion of the top closure and constituting a handle, and a method of making such bags involving formation of the slits in the side flaps after they have been folded over and sealed together.

BACKGROUND OF THE INVENTION

This invention relates to bags with handles and methods of making such bags, and more particularly to a plastic bag having a diamond-fold or satchel top closure formed with a handle, and a method of making such bags. The invention is especially concerned with the provision of a handle on a plastic bag such as shown in U.S. Pat. 3,291,376 of Ralph C. Goodwin, issued Dec. 13, 1966, entitled Bags.

Reference may be made to such prior art as U.S. Pats. 2,196,185 and 2,210,937, each showing a paper bag having a top closure including folded-over adhered-together flaps which are free in their entirety of the underlying portion of the top closure to constitute a handle for carrying the bag. Utilization of these flaps to provide a handle may be satisfactory for paper bags with the type of closure shown in these patents, but it is not satisfactory for plastic bags with a diamond-fold or satchel type of top closure as herein contemplated, and such as shown in the aforesaid Goodwin U.S. Pat. 3,291,376.

SUMMARY OF THE INVENTION

Among the several objects of this invention may be noted the provision of a plastic bag having a diamond-fold or satchel type of top closure which is formed with a handle as in integral part of the closure; the provision of such a bag in which the handle is reinforced by an insert constituting part of the closure; and the provision of methods of efficiently manufacturing such bags in quantity production. In general, a bag made in accordance with this invention has a top closure comprising inwardly directed end flaps and first and second side flaps, the side flaps being folded over on first and second fold lines extending transversely of the bag to overlie the end flaps and being secured together, the side flaps having a pair of slits therein extending alongside one another, the portion of the side flaps between the slits being free of the underlying portion of the closure to constitute a handle for carrying the bag.

The method of this invention for making a bag with such a top closure generally involves folding back a portion of one wall of a bag tube on a first fold line extending transversely across the tube to provide an end closure formation comprising end flaps and side flaps adapted to be folded over on second and third fold lines located on opposite sides of said first fold line, folding said side flaps over on said second and third fold lines and securing them together without securing them to the underlying portion of the end closure formation, and forming a pair of slits in the folded-over side flaps extending alongside one another, the portion of the side flaps between the slits constituting a handle. Other objects and features will be in part apparent and in part pointed out hereinafter.

BRIEF DESCRIPTION OF THE DRAWINGS

FIG. 1 is a view of a flat bag tube from which a bag of this invention is made, part of the tube being broken away to reduce the height of the view;

FIGS. 2 and 3 are views of opposite faces of a top closure insert;

FIG. 15 is an enlarged section on line 15—15 of FIG. 13 showing how the slits are made;

FIG. 16 is a view similar to FIG. 13 showing the completed top closure after removal of a mandrel;

FIG. 17 is a perspective of the completed bag showing the handle lifted; and

FIG. 18 is a view similar to FIG. 16, but on a reduced scale, showing a modification.

Corresponding reference characters indicate corresponding parts throughout the several views of the drawings. Thicknesses are exaggerated in certain of the views.

DESCRIPTION OF THE PREFERRED EMBODIMENTS

Figure 4:
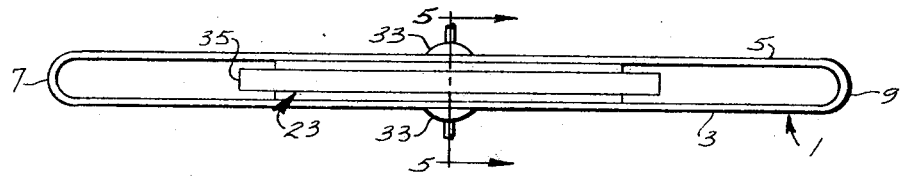
FIG. 4 is an end view of the upper end of the tube showing how the upper end of the tube is slightly opened and how the inert of FIGS. 2 and 3 is inserted in the tube.
Figure 6:
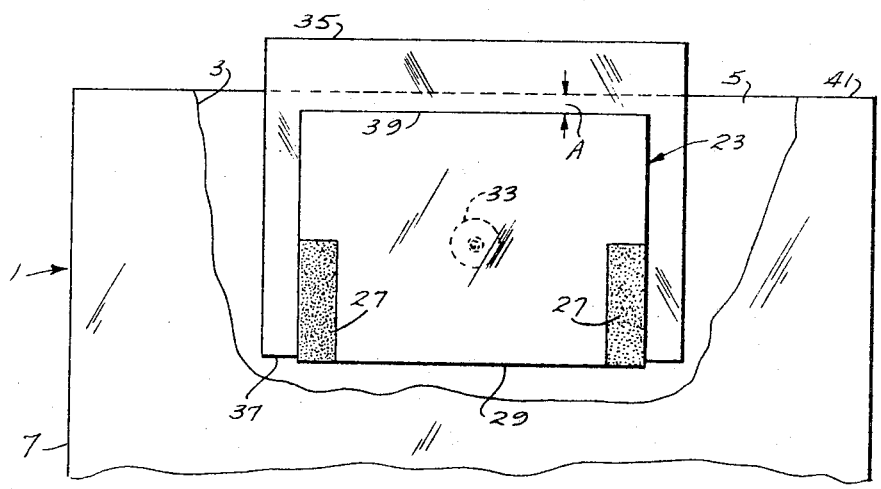
FIG. 6 is a side elevation, partly broken away, showing how the insert is inserted.

Referring to the drawings, there is indicated at 1 a flat bag tube from which a valve bag of this invention may be made, this tube being made of flexible heat-sealable sheet plastic material such as polyethylene. The opposed walls of the tube are designated 3 and 5. Wall 3 may be referred to as the front wall and wall 5 as the back wall. The side folds of the tube, which constitute its side edges, are designated 7 and 9. The tube has straight-cut ends. It will be understood that it may be segmented from a continuous length of plastic tubing (e.g., polyethylene) of either the seamed or seamless type. Indicated at 11 in FIG. 1 is a fold line extending transversely across the tube on which an upper end portion 13 of the front wall 3 is adapted to be folded back to open up the upper end of the tube to form triangular end flaps 15 of a diamond-fold or satchel top end closure formation. Also indicated at 17 in FIG. 1 are fold lines extending at a 45° angle from the ends 19 of line 11, these lines 17 ultimately constituting the sides of the triangular end flaps.

Figure 9:
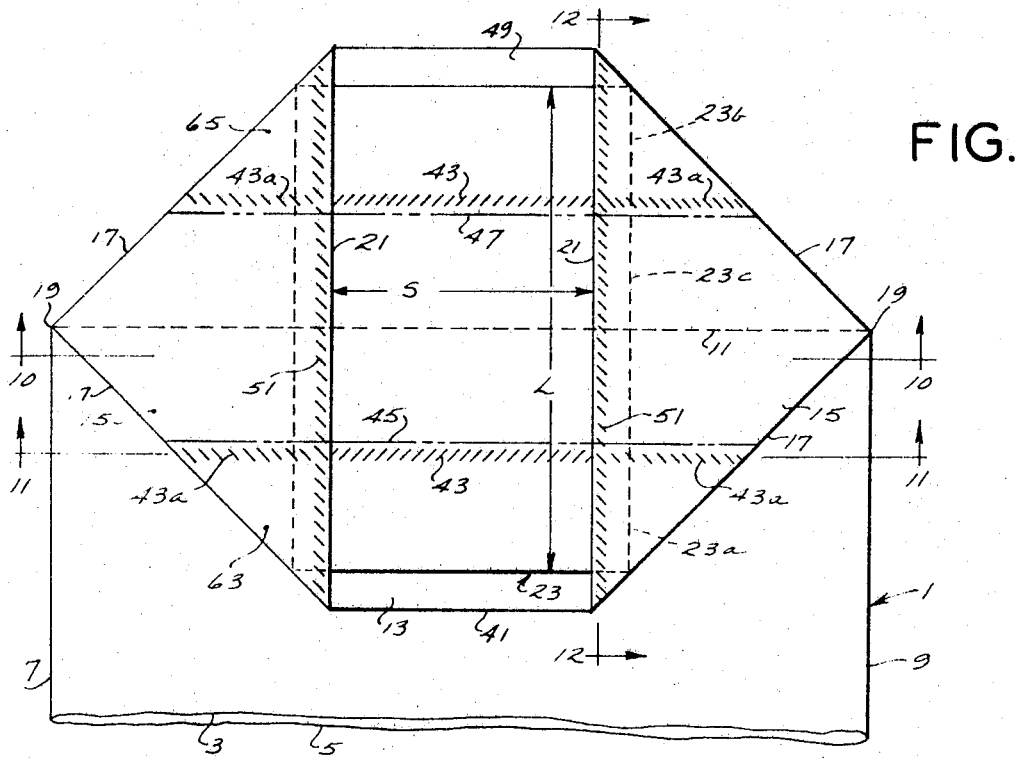
FIG. 9 is a view showing the upper end of the tube completely opened for the formation of a diamond-fold top closure.
Figure 10:
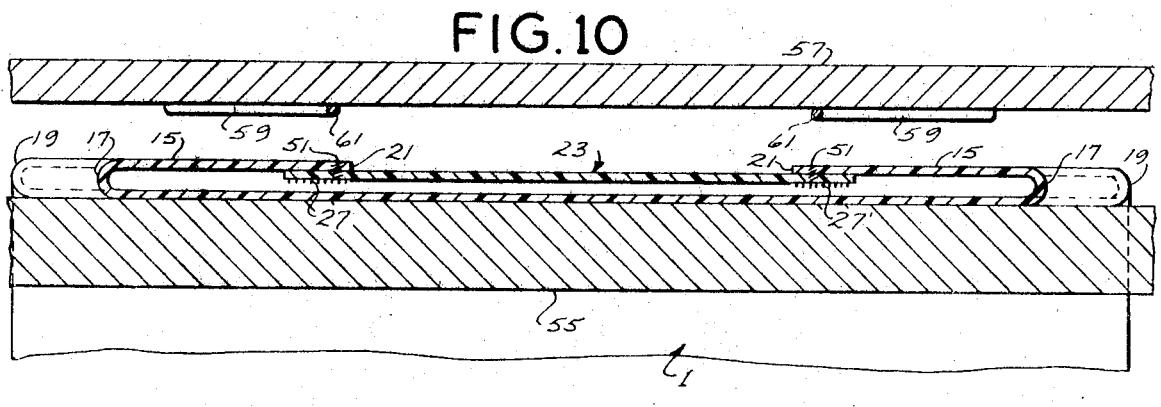
FIGS. 10–12 are enlarged sections on line 10—10, 11—11 and 12—12, respectively, of FIG. 9, also showing how certain heat seals may be made.

Referring to FIGS. 9 and 10, the inner end edges of these triangular end flaps 15 are designated 21, and are shown as being spaced from one another (when the end closure formation is opened up) a distance S.

Now referring to FIGS. 2 and 3, there is illustrated a rectangular blank or insert 23 of the same heat-sealable sheet plastic material (e.g., polyethylene) as the material of the tube 1, which is used in forming the top closure in a manner that will appear. This rectangular insert 23 has an overall width W somewhat greater than the spacing S of the inner end edges 21 of the end flaps and a length L approximately the length of the inner end edge 21 of each end flap 15. Preferably, the length L is somewhat less than the length of the inner end edge 21 of each end flap, and generally equal to the length of edge 21 minus the difference W and S. It is provided on one face 25 thereof (which face is its inside face as it is assembled with the tube) with stripes 27 (see FIG. 3) of heat-seal-inhibiting material at the sides thereof, these stripes extending equally on opposite sides of the widthwise center line 29 of the insert, and each stripe having a length generally equal to the width of the end closure ultimately to be formed. The heat-seal-inhibiting material used at 27 may be, for example, a commercially available polyamide-base ink printed on the insert. The spacing of the inner edges of stripes 27 generally equals S. The other face 31 of the insert is bare (i.e., there is no heat-seal-inhibiting material thereon).

Figure 5:
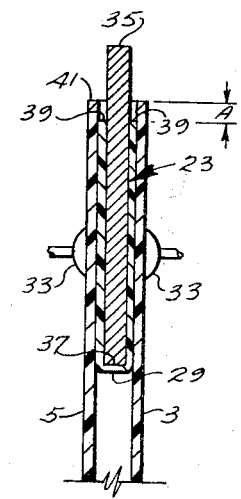
FIG. 5 is a section on line 5—5 of FIG. 4, showing how the insert is inserted.

Referring to FIGS. 4 and 5, in the manufacture of a bag in accordance with this invention, the end of the tube 1 at which the bag top closure is to be made is opened up slightly for insertion of the insert 23 as by means of suction cups 33 (i.e., the suction cups are applied to the outside of the front and back walls 3 and 5 and separated to spread apart the front and back walls). The insert 23 is inserted into the tube (i.e., inserted between its spread-apart front and back walls) by means of an inserter plate or ram 35. The insert is folded in half on its widthwise center line 29 around the edge 37 of the ram, with the heat-seal-inhibiitng stripes 27 on the outside of the folded-in-half insert, and the ram with the insert folded around its edge 37 is inserted into the tube, centered with respect to the width of the tube, to the point where the fold on line 29 is generally coincident with the fold line 11 of the tube. As shown, the length L of the insert is such that this brings the insert to a position wherein its opposite end edges 39 are spaced inward a short distance A from the end edges 41 of the tube.

Figure 7:
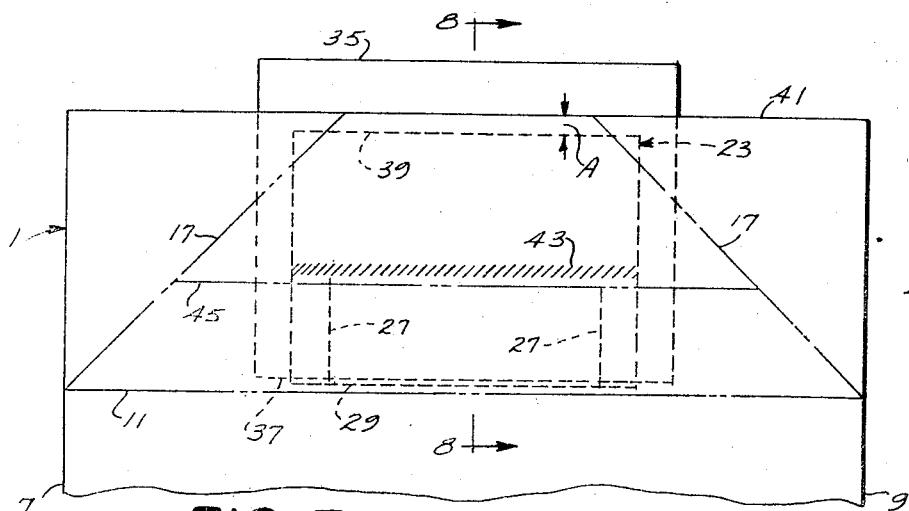
FIG. 7 is a side elevation showing how the insert is initially sealed to the walls of the tube.
Figure 8:
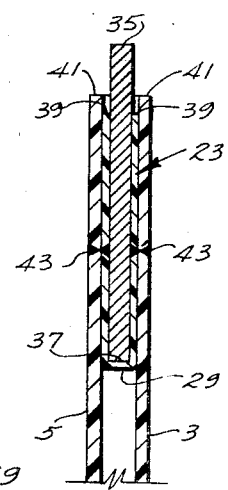
FIG. 8 is a section on line 8—8 of FIG. 7.

With the folded insert and ram so positioned in the tube 1, heat seals are made on lines 43 (see FIGS. 7 and 8) extending across the width of the insert to effect heat-sealing together of the front wall 3 of the tube and one of the halves (the front half) of the folded insert along one line 43 and heat-sealing together of the back wall 5 of the tube and the other half (the back half) of the folded insert. Each of these lines of seal 43 is spaced outward (upward) of fold line 11 a distance somewhat greater than half the width of the end closure ultimately to be formed, this width being defined by the fold lines represented at 45 and 47 in FIG. 9. These fold lines are spaced inward from the end edges 41 of the tube a distance somewhat greater than half the distance from end edges 41 to fold line 11. The ram, being interposed between the two halves of the folded insert, prevents the two halves from becoming heat-sealed together. The ram may, for example, comprise a metal plate coated with a heat-seal-inhibiting material such as polymerized tetrafluoroethylene sold under the trade name Teflon by E. I. du Pont de Nemours Co. The seals at 43 may be made, for example, by moving two platens each carrying a hot sealing bar or wire for making a seal 43 against opposite sides of the upper end of the tube.

After the sealing of the insert to the front and back walls of the tube on lines 43, the ram is withdrawn, and the upper end of the tube is opened up to provide a diamond-fold top closure formation as shown in FIG. 9 by folding back the upper end portion 13 of the front wall 3 of the tube on fold line 11. This operation results in the formation of the end flaps 15 and an upward extension 49 of the back wall. Each of the end flaps 15 is of triangular form, having an apex at the respective end 19 of fold line 11, the sides of the triangle being constituted by folds on the 45° lines 17 extending from the apex 19. The inner end edges of the triangular end flaps appear at 21, being spaced from one another the distance S. As a result of opening up the end of the tube, the insert 23 is spread flat and lies in position spanning the inner end edges 21 of the end flaps 15 and lapping the inner end margins of the end flaps, the side margins of the insert underlying the inner end margins of the end flaps.

With the upper end of the tube opened up as above described, heat seals are made on lines 43a extending from the ends of seals 43 and in line therewith and in continuation thereof out to the folds at 17, and also on lines 51 extending generally paralel to the inner end edges 21 of the end flaps 15 and spaced slightly outward from edges 21 to effect heat-sealing together of the end flaps and the underlying side margins of the insert 23. Lines 51 extend the full length L of the insert. They extend endwise of the stripes 27 of heat-seal-inhibiting material so that the intermediate portions of seals 51 are made only between the end flaps 15 and the insert, leaving the insert free of the underlying regions of the portions of the walls of the tube 1 in the closure formation. However, from the ends of stripes 29 outward, the end flaps 15, the insert and the underlying regions of the portions of the walls of the tube in the closure formation become sealed together on lines 51.

Figure 11:
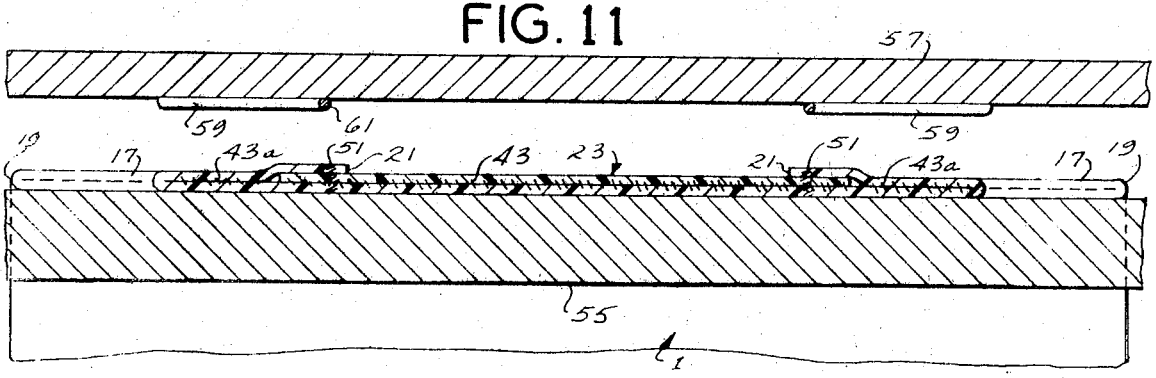
Figure 12:
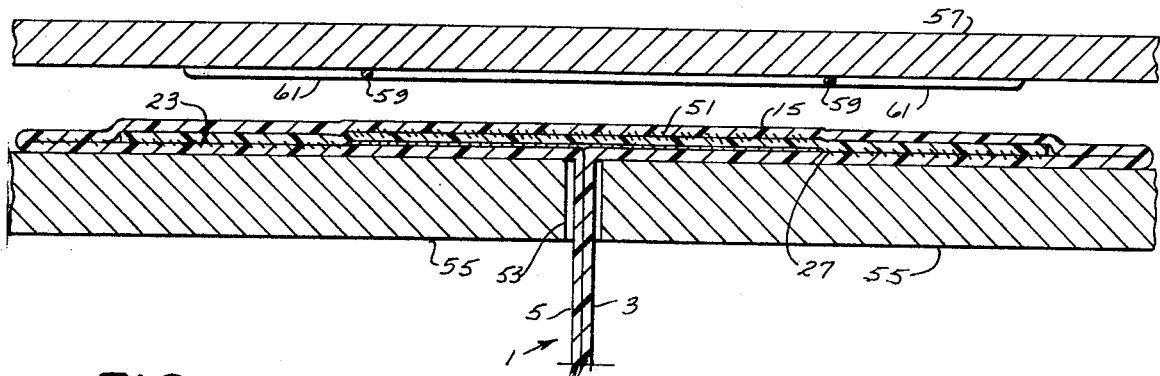

In forming the heat seals 43a and 51, the end closure formation is positioned perpendicular to walls 3 and 5 of the tube, the walls being entered in a slot 53 in a back-up member 55 (see FIG. 12) and the bottom formation spread out flat on the back-up member. Then the seals at 43a and 51 are made, for example, by moving a platen 57 (see FIGS. 10–12) carrying hot sealing bars or wires 59 and 61 arranged in a pattern for making the seals at 43a and 51 to bring the hot bars or wires into pressure engagement with the end closure formation. It will be apparent from FIG. 10 how the heat-seal-inhibiting material at 29 prevents sealing together of the end margins of insert 23 and the underlying layer of material.

Figure 13:
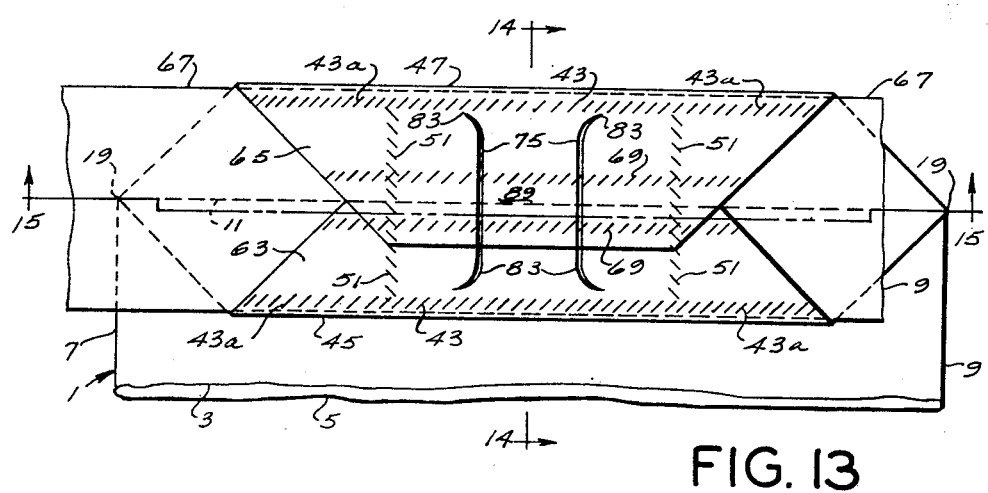
FIG. 13 is a view showing the side flaps of the top closure folded over and sealed, and certain slits in the sealed side flaps.
Figure 14:
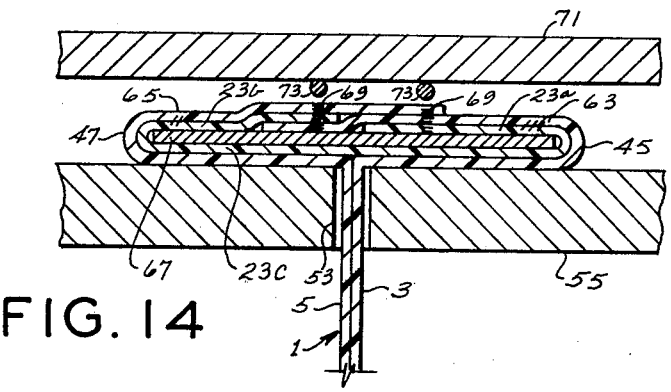
FIG. 14 is an enlarged section on line 14—14 of FIG. 13, showing how the side flaps are sealed.

That part of the end closure formation lying outward of fold line 45 constitutes a first side flap 63 (to be folded over on line 45) and that part of the end closure formation lying outward of fold line 47 constitutes a second side flap 65 (to be folded over on line 47). The fold lines 45 and 47 are located for lapping of these side flaps 63 and 65 when they are folded over. After the formation of seals 43a and 51, the first side flap 63 is folded over on fold line 45 to overlie the end flaps 15, and the second side flap 65 is folded over on fold line 47 to overlap the flap 63 as shown in FIGS. 13 and 14. As appears in FIG. 14, this folding over of the side flaps is carried out around the edges of a thin flat heat-seal-inhibiting mandrel 67. This mandrel has a width corresponding to the width desired for the completed bottom closure (i.e., the spacing of lines 45 and 47) and is positioned extending endwise of the closure formation and centered in respect thereto. When the side flaps 63 and 65 are folded over, end portion 23a of insert 23 lying outward of fold line 45 folds over with side flap 63, and end portion 23b of insert 23 lying outward of fold line 47 folds over with side flap 65. The central portion of the insert between lines 45 and 47 is designated 23c. After the side flaps 63 and 65 and portions 23a and 23b of the insert 23 have been folded over and lapped, their lapping margins are heat-sealed together on two spaced lines of seal 69 extending across these margins. The seals 69 are made, for example, by moving a platen 71 carrying hot sealing bars or wires 73 for making these seals downward to bring the wires into pressure engagment with the lapping margins of the side flaps. The mandrel separates the folded-over side flaps 63 and 65 and insert portions 23a and 23b from the underlying central portion 23c of the insert and the underlying areas of the portions of the tube walls in the end closure formation to prevent the heat seals made on lines 69 from striking through to the central portion of the insert and these areas, thereby preventing blocking.

With the heat-seal-inhibiting mandrel 67 still in place, a pair of slits 75 is formed in the folded-over sealed-together side flaps 63 and 65, these slits extending alongside one another transversely with respect to the fold lines 45 and 47 from adjacent one of these lines to adjacent the other. These slits are preferably formed by applying a heat-sealing instrumentality to the side flaps to melt through the side flaps and the underlying folded-over portions 23a and 23b of the insert 23, with accompanying heat-sealing together of the edges of the side flaps and portions 23a and 23b on opposite sides of the slits, as indicated at 77 in FIG. 15. The heat-sealing instrumentality employed for forming the slits 75 may comprise a platen 79 carrying hot sealing bars or wires 81 arranged in a pattern for making the slits, as shown in FIGS. 14 and 15. The slits are preferably outwardly curved at their ends, as indicated at 83.

Following the formation of the slits 75, the mandrel 67 is removed, and seals are made at 85 in the nature of spot seals as shown in FIG. 16 to seal the side flaps 63 and 65 to the end flaps 15 at regions lying outward of the slits. This completes the formation of the top closure of the bag. A bottom closure 87 (see FIG. 17) of any suitable formation is provided at the other end of the tube 1. Preferably, this bottom closure is a valved diamond fold or satchel closure, and may be made as disclosed in the aforesaid Goodwin U.S. Pat. 3,291,376.

From the above, it will appear that the completed bag has a top closure comprising the inwardly directed end flaps 15 and the first and second side flaps 63 and 65 folded over on the fold lines 45 and 47 to overlie the end flaps and secured together at 69. The side flaps 63 and 65 have the pair of slits 75 therein extending transversely with respect to fold lines 45 and 47 and spaced longitudinally of the side flaps (lying on opposite sides of the center of length of the side flaps). The portion 89 of the side flaps between slits 75 is free of the underlying portion of the closure (i.e., free of the central portion 23c of the insert) to constitute a handle for carrying the bag. The portions of the side flaps outward of the slits are secured to the end flaps by the seals at 85. The insert 23, which spans the inner end edges 21 of the end flaps 15 and which has its margins lapping the end flaps and secured thereto by seals 51, has end portions 23a and 23b folded over with the side flaps and thus incorporated therein for reinforcing the handle 89. The sealing together at 77 of the edges of the side flaps and the end portions of the insert on opposite sides of the slits eliminates the possibility of a user inserting his fingers between the side flaps and the end portions of the insert and carying the weight of the filled bag on the side flaps only, and reinforces the handle against tearing at the ends of the slits.

It will be understood that, in certain instances, reinforcement of the handle may not be needed, and in such case the insert may be made as shown in the aforesaid U.S. Pat. 3,291,376 without end portions 23a and 23b.

FIG. 18 illustrates a modification in which the handle-forming slits, designated 75a, are formed to extend alongside one another longitudinally of the side flaps and spaced transversely of the side flaps (lying on opposite sides of the longitudinal center line of the side flaps) instead of being formed to extend transversely with respect to the side flaps. The closure shown in FIG. 18 is made in the same manner as that shown in FIGS. 16 and 17 except for the direction of the slits.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A bag having a top closure comprising inwardly directed end flaps and first and second side flaps, the side flaps being folded over on first and second fold lines extending transversely of the bag to overlie the end flaps and being secured together, the side flaps having a pair of slits therein extending alongside one another, the portion of the side flaps between the slits being free of the underlying portion of the closure to constitute a handle for carrying the bag.

2. A bag as set forth in claim 1 wherein the slits extend transversely with respect to said fold lines and are spaced longitudinally of the side flaps.

3. A bag as set forth in claim 1 wherein the slits extend longitudinally of the side flaps and are spaced transversely of the side flaps.

4. A bag as set forth in claim 1 wherein portions of the side flaps adjacent their ends and lying outward of the slits are secured to the end flaps.

5. A bag as set forth in claim 4 having an insert incorporated in the side flaps for reinforcing said handle.

6. A bag as set forth in claim 5 wherein the inner end edges of the end flaps are spaced from one another and the insert spans said inner end edges of the end flaps and has its margins lapping and secured to said end flaps, said insert having a central portion underlying the side flaps and end portions folded over with the side flaps.

7. A bag as set forth in claim 1 made of flexible heat-sealable sheet material, the side flaps being heat-sealed together.

8. A bag as set forth in claim 7 wherein portions of the side flaps adjacent their ends lying outward of the slits are heat-sealed to the end flaps.

9. A bag as set forth in claim 8 having an insert of flexible heat-sealable sheet material incorporated in the side flaps for reinforcing the handle.

10. A bag as set forth in claim 9 wherein the inner end edges of the end flaps are spaced from one another and the insert spans said inner end edges of the end flaps and has its margins lapping and heat-sealed to said end flaps, said insert having a central portion underlying the side flaps and end portions folded over with the side flaps.

11. A bag as set forth in claim 9 wherein the edges of the side flaps and the edges of the end portions of the insert on opposite sides of the slits are heat-sealed together.

References Cited

UNITED STATES PATENTS 2,482,399   9/1949   Bullock _____ 229—54 X
3,291,376   12/1966  Goodwin _____ 229—62.5

DAVID M. BOCKENEK, Primary Examiner

U.S. Cl. X.R.

150—3, 12; 229—58